Oct. 1, 1929.  M. G. BENJAMIN  1,729,700
COMBUSTION CONTROL
Filed March 22, 1924  4 Sheets-Sheet 1

INVENTOR

Oct. 1, 1929.  M. G. BENJAMIN  1,729,700
COMBUSTION CONTROL
Filed March 22, 1924  4 Sheets-Sheet 3

INVENTOR
Merrill G. Benjamin
by his attorneys
Byrnes, Stebbins & Parmelee

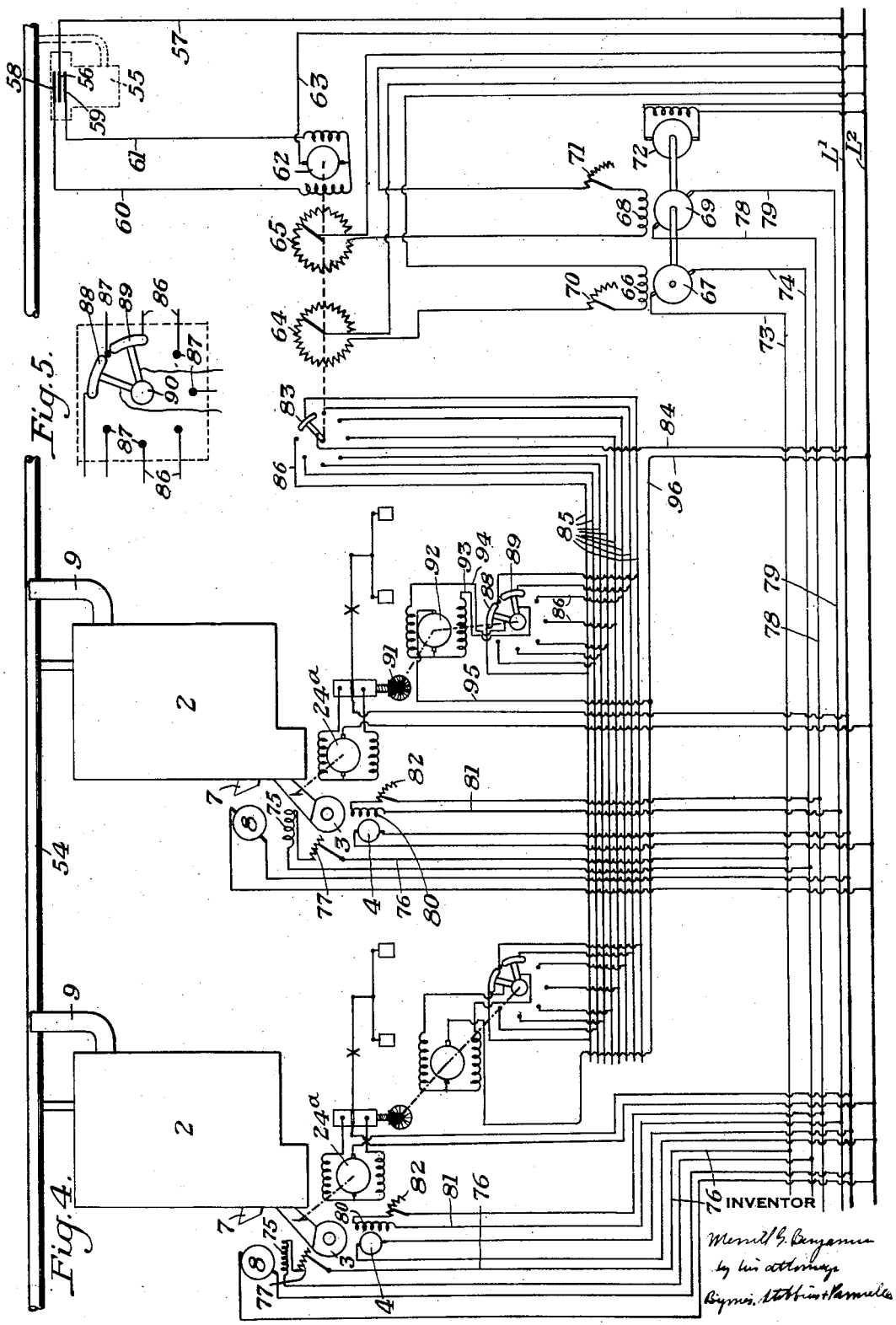

Patented Oct. 1, 1929

1,729,700

UNITED STATES PATENT OFFICE

MERRILL G. BENJAMIN, OF LAKEWOOD, OHIO, ASSIGNOR, BY MESNE ASSIGNMENTS, TO BAILEY METER COMPANY, A CORPORATION OF DELAWARE

COMBUSTION CONTROL

Application filed March 22, 1924. Serial No. 701,160.

This invention relates to combustion control and is particularly applicable to the controlling of a battery of furnaces, although certain features of the invention may be readily applied to a single furnace. The invention is particularly desirable when used in connection with a battery of boiler furnaces although it may be applied to other forms of furnaces.

I provide a control system wherein an established pressure is automatically maintained at any given point in the furnace while an automatically varying pressure drop through the furnace is impressed thereon and maintained in accordance with a function of the furnace. The function of the furnace which primarily controls the apparatus may be steam pressure or steam flow in the case of a boiler furnace or battery of boilers, gas flow in the case of gas producers, and the like.

In the patent to Lawrence J. Hess and myself, No. 1,518,924, dated December 9, 1924, there is illustrated and described a system of furnace control wherein the fuel and air supply to a furnace are automatically varied in amount in accordance with a function of the furnace and also are varied in proportion with varying furnace loads. The present system contemplates a general control system substantially as set forth in that application, but provides a further control in that the quantity of air supplied to each furnace of a battery is virtually measured and a more accurate control thus attained. This is preferably accomplished by controlling the forced draft and stack dampers in accordance with a function of the furnace or battery of furnaces and also in accordance with pressure conditions in the individual furnaces. For example, the stack draft damper may be controlled solely in accordance with a pressure condition at a given point in the furnace and thus tend to maintain the pressure at that point constant while the forced draft damper may be controlled in accordance with pressure conditions at two points in the furnace, thus maintaining a given pressure drop between these points unless the action of the damper control mechanism is modified by the centralized control system which is effective for controlling all the furnaces in the battery and automatically varying the pressure drop which is to be maintained.

Figure 1:
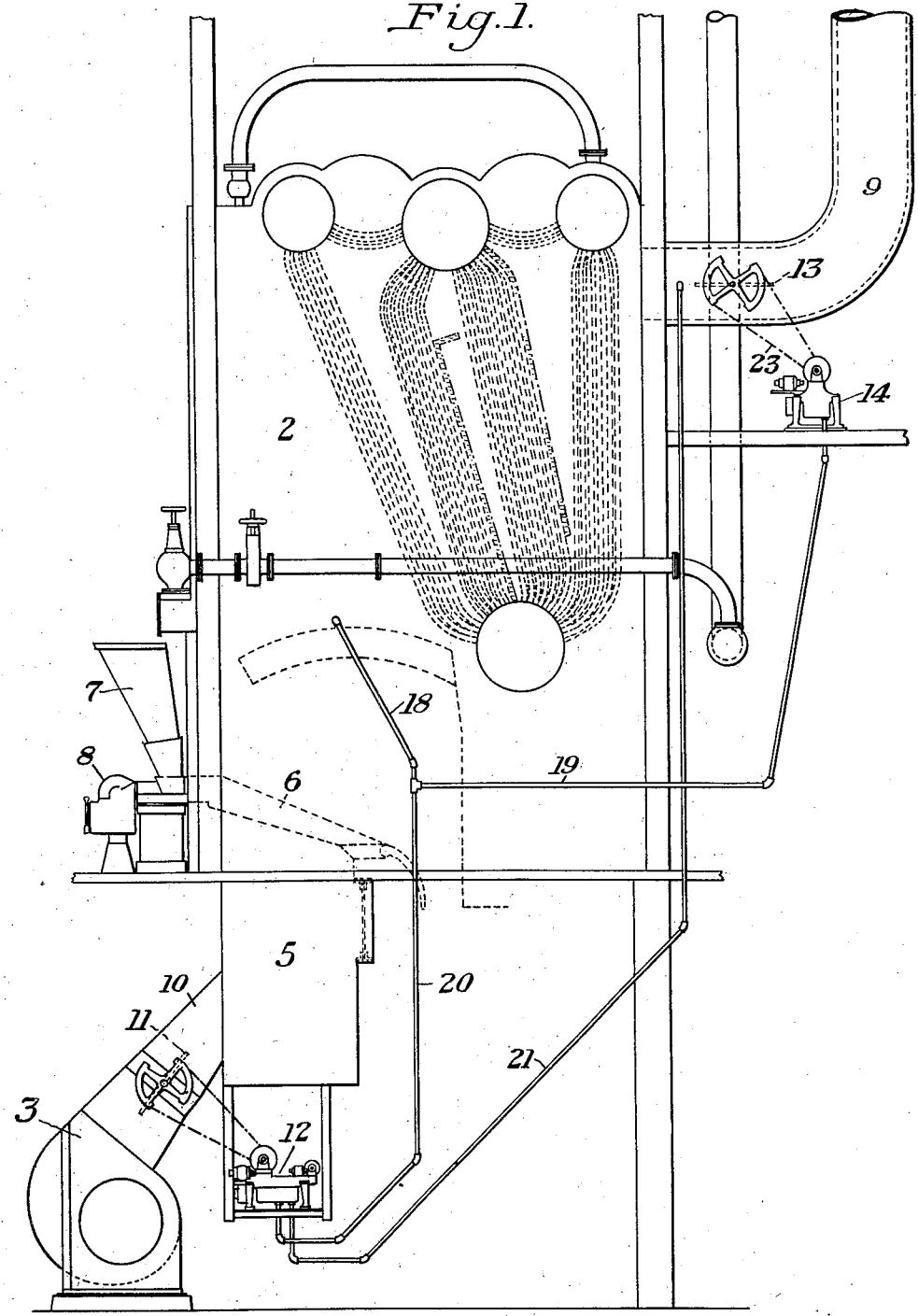
Figure 2:
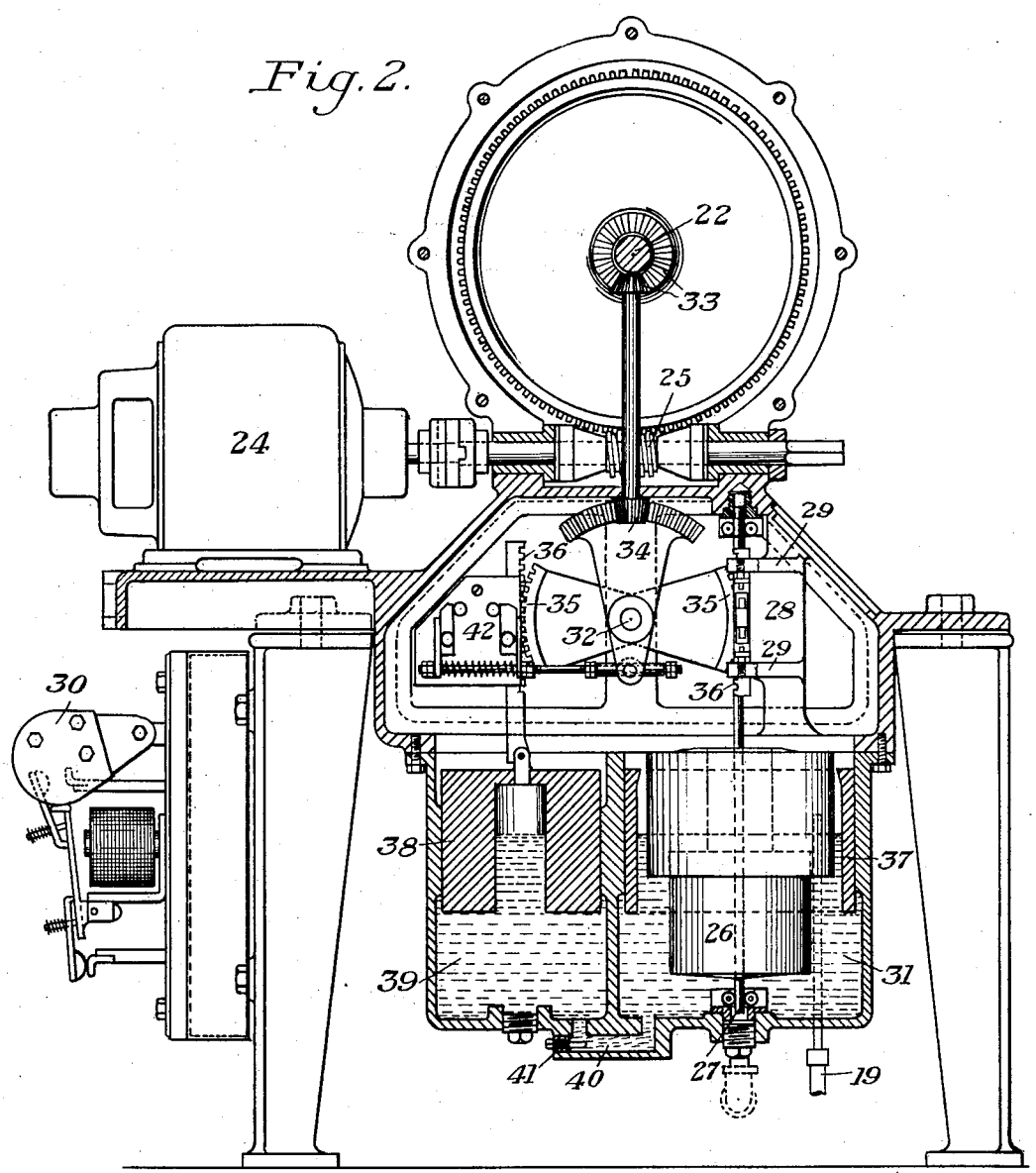
Figure 3:
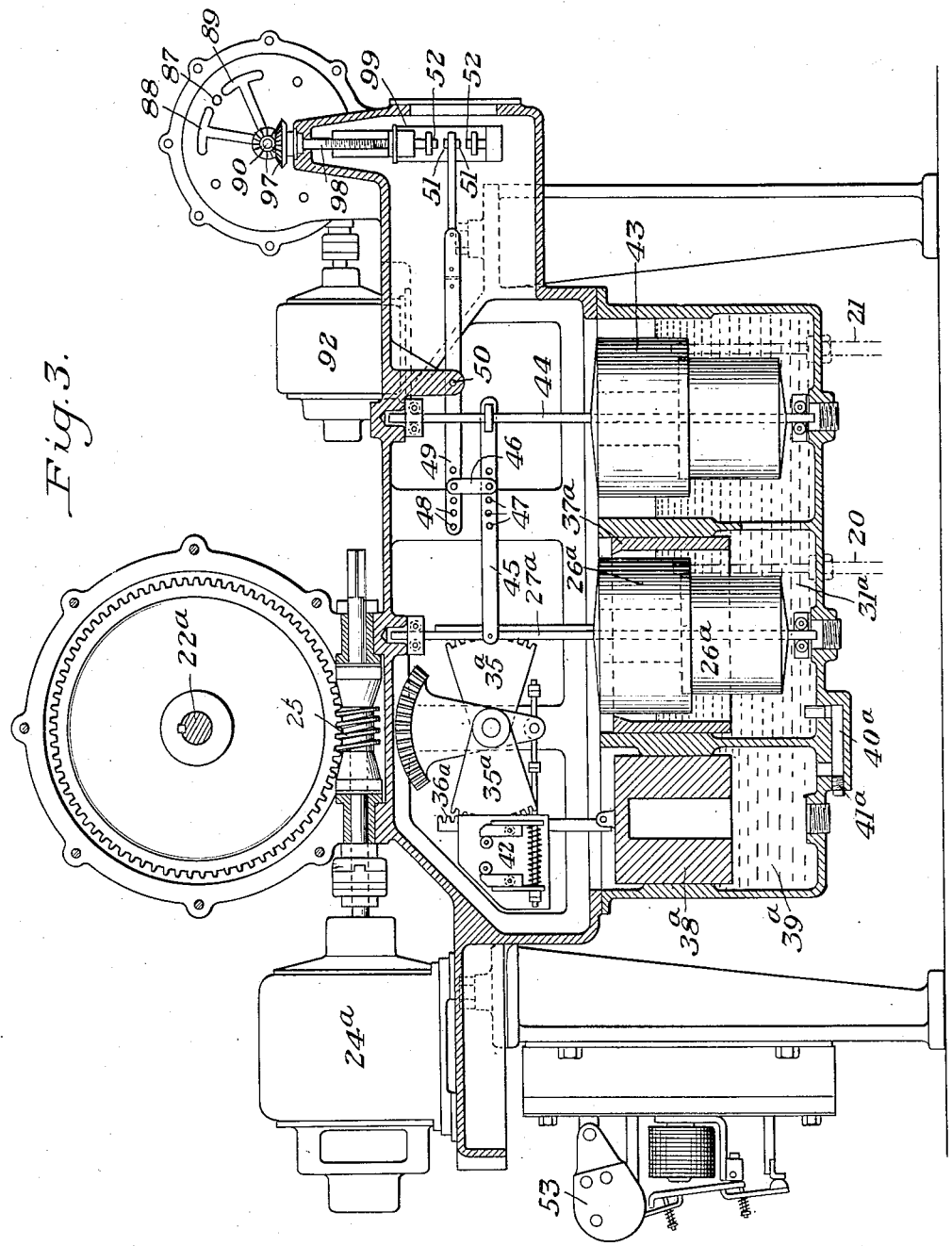

In the accompanying drawings, which illustrate the preferred embodiment of the invention, Figure 1 is a side elevation of a boiler furnace embodying my invention and showing a stack damper control mechanism and a forced draft damper control mechanism, Figure 2 is a central vertical section through the stack draft damper apparatus shown in Figure 1, Figure 3 is a similar view of the forced draft damper mechanism shown in Figure 1, Figure 4 is a wiring diagram of a plurality of boiler furnaces embodying the invention, and Figure 5 is a view to enlarged scale of a portion of Figure 4.

In the illustrated embodiment of the invention there is shown a plurality of boiler furnaces 2 each having a forced draft fan 3 driven by a motor 4 and connected with a wind box 5 below a grate 6. The furnace is supplied with fuel by suitable fuel feeding mechanism 7 operated by a motor 8. The products of combustion are carried off by a suitable stack connection 9.

The blower 3 is connected with the wind box 5 by an air conduit 10 having a damper 11 therein, the position of this damper being set by suitable mechanism indicated generally by the reference character 12. The stack connection 9 has a damper 13 therein which is set by suitable mechanism 14.

The stack draft controller 14 is connected to the furnace by pipes 18 and 19 and is responsive to the pressure condition transmitted from the furnace through these pipes. The forced draft damper controller 12 is connected to a furnace through pipes 18 and 20 and also makes connection adjacent the stack damper 13 by a pipe 21. The controller 12 is actuated in accordance with the pressure conditions transmitted from the furnace and stack connection by these two pipes and is effective for maintaining a given pressure drop between the two points in the furnace. The apparatus is also subject to the centralized control system which serves to vary the pressure drop that the controller 12 tends to maintain.

The stack draft controller 14 is shown in more detail in Figure 2 and is particularly described and claimed in my Patent No. 1,583,440, dated May 4, 1926.

This mechanism comprises a sprocket shaft 22 making suitable connection with the damper 13 through a chain drive 23 and actuated by a motor 24 through worm gearing 25. The motor 24 is controlled in accordance with pressure conditions communicated by the pipe 19 through a gasometer bell and float 26 mounted on a vertically movable rod 27 and carrying contacts 28 adapted to cooperate with stationary contacts 29, thus actuating a relay switch 30 for connecting or disconnecting the motor 24.

The gasometer bell and float 26 are carried in an oil bath 31 through which the pipe 19 projects, terminating under the gasometer bell above the oil level. The vertical position of the bell and its supporting rod 27 therefore vary with the pressure under the bell and make suitable connection through the upper or lower contact 29, depending on whether the pressure in the furnace is above or below that which it is desired to maintain, and operating the motor 24 over a sufficient period to properly set the damper 13 and bring the furnace back to the normal pressure condition. The contacts 29 are vertically adjustable as shown and may be set from time to time as desired. This adjustment is not primarily intended to be used for altering the pressure which the apparatus tends to maintain, but is used for adjusting the delicacy of the control.

As set forth in my patent above referred to, and as shown in Figure 2, the sprocket shaft 22 is connected to a shaft 32 through suitable bevel gears 33 and 34. This shaft carries gear segments 35 meshing with racks 36 connected to plungers 37 and 38 which are partially submerged in the oil chamber 31 and an oil chamber 39, respectively. These two chambers are connected by a passage 40 having an adjustable restricting plug 41 therein. The function of the plungers 37 and 38 is to cause a temporary change in the oil level of the chamber 31 and thus prevent hunting. For example, if an excess pressure condition exists in the furnace the gasometer bell will tend to rise and the motor 24 will be operated to open the damper 13. If the opening of the chamber were continued until a response in the furnace pressure was communicated to the gasometer bell there would always be a tendency to over-travel and the plunger 37 is therefore connected to the sprocket shaft 22 in such manner as to be raised when the damper 13 is opened, the plunger 38 being correspondingly lowered. The partial withdrawal of the plunger 37 from the oil bath 31 temporarily lowers its level and checks the action of the gasometer bell so that sufficient time is allowed for the changed damper position to have its effect communicated to the combustion chamber without over-travel of the damper. Through the action of the plungers it will be seen that as plunger 37 is withdrawn from the oil, plunger 38 is further immersed; this action, while lowering the oil level in chamber 31, raises the oil level in chamber 39, but only temporarily since the two chambers are connected by passage 40, the restriction of which is regulated by plug 41 so that the time required for a readjustment to normal oil level in both chambers will approximately equal the time required to communicate the effect of changing damper position back through the boiler passes to the combustion chamber. Limit switches 42 are suitably connected with the shaft 32 to prevent over-travel of the motor.

The forced draft control mechanism 12 is shown in detail in Figure 3. It will be seen that the apparatus in many respects is identical with that shown in Figure 2 and corresponding parts have been given a corresponding reference character with the letter "a" suffixed thereto.

The gasometer bell 26$^a$ is controlled by the pressure communicated through the pipe 20 and a supplemental bell 43 is controlled by pressure conditions communicated through the pipe 21. The bell 43 is carried on a rod 44 which is connected to the rod 27$^a$ by a substantially horizontal pivoted link 45. A connecting link 46 is fastened in one of a series of holes 47 in the link 45 and one of a series of holes 48 in a contact lever 49. This lever is pivoted to the frame of the apparatus at 50 and carries contacts 51 at its outer end. The contacts 51 cooperate with relatively stationary contacts 52 communicating with a relay switch 53 for controlling the forced draft damper motor 24$^a$. This motor is of the split field type and operates in one direction or the other, depending on which portion of the field is thrown in the circuit and therefore depending on whether the contacts 51 are moved up or down.

Since the stack damper control tends to maintain a constant pressure condition at a given point in the furnace which, in this case, is the over fire pressure in the furnace and communicated through the pipe 18, and since the pipe 20 is connected with the pipe 18, the general tendency of the gasometer bell 26$^a$ will be to remain stationary. However, the relative position of the gasometer bells 26$^a$ and 43 will always depend upon the pressure condition between the terminal points of the pipes 18 and 21 and the link 45 will be correspondingly inclined. The amount of movement which will be communicated to the link 49 depends upon which of the holes 47 and 48 are occupied by the connecting link 46. These holes therefore serve as an adjustment on the delicacy of the apparatus.

Referring to Figure 4 there is shown an elementary wiring diagram for a battery of boiler furnaces, the relay controls being omitted as their application to such control system will be well understood by those skilled in the art.

In this figure the boiler furnaces 2 supply a steam main 54 connected to a master regulator 55 of any desired type, for example that shown in my copending application, Serial No. 703,324, filed Mar. 31, 1924. The regulator 55 is effective for operating a movable contact 56 connected to a line wire $L^1$ by a wire 57. The contact 56 cooperates with stationary contacts 58 and 59 connected by wires 60 and 61, respectively, to the two field windings of a split field motor 62, the circuit being completed through a wire 63 leading to a line wire $L^2$. Depending upon the steam pressure in the main the contact 56 is moved up or down to connect with either of the contacts 58 and 59, thus operating the motor 62 in one direction or the other. The motor 62 is suitably connected for driving the contact arms of rheostats 64 and 65. The rheostat 64 is in circuit with the field 66 of a generator 67 and the rheostat 65 is in circuit with the field 68 of a generator 69 and the operation of the motor 62 therefore tends to vary the fields 66 and 68 and thus vary the output of the generators 67 and 69. By making the rheostats 64 and 65 of different resistances the generators 67 and 69 may be so controlled as to vary their relative outputs at different settings of the rheostats. A further control may be effected by manually operated rheostats 70 and 71.

The generators 67 and 69 are preferably driven at constant speed from any power source, as, for example, by a motor 72 connected to the line wires $L^1$ and $L^2$.

The generator 67 supplies feed wires 73 and 74 and the fields 75 of the fuel feed motors 8 are connected across these feed wires by wires 76. The amount of fuel fed to each furnace depends upon the speed of the motor 8 and this, in turn, is controlled by the intensity of the field 75 and therefore upon the output of the generator 67. Any number of fuel motors may be connected to the feed wires 73 and 74 and they will all be controlled simultaneously and in the same amount. Rheostats 77 are placed in each circuit to compensate for individual characteristics of any particular furnace, for example, one furnace may be dirty while the others are clean, and, consequently require fuel and air in different quantities and ratios than the other boilers of the battery. The rheostats 77 provide for such compensation as far as fuel feed is concerned.

The generator 69 supplies feed wires 78 and 79 across which the fields 80 of the blower motors 4 are connected by wires 81, each motor being provided with a manually operated rheostat 82 corresponding to the rheostat 77.

The mechanism so far described is effective for supplying fuel and air in definite proportions at a given boiler rating, and also for maintaining a definite over fire pressure and a definite pressure drop through each furnace. It is desirable to vary the pressure drop through the furnace with variations in the furnace load and this may be readily accomplished by suitably shifting the relatively stationary contacts 52. If these are moved upwardly, for example, the tendency of the forced draft controller 12 will be to close the damper 11 and thus reduce the quantity of air supplied to the furnace. If this is done the pressure drop required for the reduced quantity of air to pass through the furnace will not be so great and the gasometer bell 43 will therefore rise and the new condition imposed by the position of the contacts 52 will be thereafter maintained. The converse is true if the contacts are lowered.

The position of the contacts 52 is determined by the position of a contact arm 83 which is moved with the contact arms of the rheostats 64 and 65 by the motor 62. The contact arm 83 is connected to the line $L^1$ by a wire 84 and makes contact with any one of a series of wires 85, depending upon the position of the contact arm. Leads 86 are taken from each of the wires 85 at each draft controller 12 and terminate in contacts 87. As the contact arm 83 is rotated it successively crosses the terminals of the wires 85 and the corresponding terminals 87 will be connected to the line wire $L^1$, all the other contacts being dead. A pair of spaced contacts 88 and 89 is mounted on a shaft 90 connected by worm gearing 91 to a split field motor 92. The contact arm 88 is connected to one side of the field by a wire 93 and the contact 89 is connected to the other side of the field by a wire 94.

As shown in Figure 5 the structure of the contact arms 88 and 89 is such that they will always make contact with at least two of the terminals 87 and may make contact with two such terminals and have another terminal lying between them. Start from this position and assume that the terminal between the contact arms 88 and 89 is connected with the particular terminal of the wire 85 which is at that time connected to the contact arm 83. If the regulator 55 is actuated by a change of pressure in the steam main the motor 62 will be operated and the contact arm 83 moved to a terminal of another of the wires 85 on one side or the other of the previously connected terminal, depending on which way the motor 62 is operated.

When this occurs either the contact 88 or 89 will serve to carry current to the motor 92 which will be driven in one direction or the other, depending on the direction of movement of the contact arm 83. The circuit is completed through a wire 95 connected to a wire 96 which leads to the line wire L².

Since the contact arms 88 and 89 are driven by the motor 92 through the worm gearing 91 the tendency is always for the motor to turn itself off by moving to a position where the contact arms 88 and 89 "straddle" the live contact. The shaft 90 carries one of a pair of bevel gears 97 actuating a screw 98 threaded into a frame 99 on which the contacts 52 are mounted. The position of the contacts 52 is therefore dependent on the position of the arm 83 and the forced draft controller 12 will therefore tend to maintain a pressure drop through the furnace corresponding to the furnace load.

I provide a highly effective means for controlling either one furnace or a battery of furnaces in accordance with a function of the furnace or with a function of the entire battery. The control is directed not only toward the automatic maintenance of a definite pressure at a given point in the furnace and a definite pressure drop through the furnace depending upon the furnace load, but also in combination with the supply of fuel and air in absolute proportions and quantities as broadly disclosed and claimed in the application of Hess and Benjamin, above referred to.

The electrical control is highly desirable in apparatus of this character, particularly when a battery of furnaces is to be controlled since compensation for individual characteristics of the different furnaces may be readily made and, furthermore, any number of furnaces may be cut into or out of the battery without the necessity of manual adjustment or other modification of the general battery control.

Obviously, the points at which the furnace pressures are taken for actuating the damper controllers may be positioned as desired, and the terms "pressure in the furnace", "pressure drop through the furnace" and the like, are meant to cover not only the furnace proper, but also the furnace adjuncts involved in the passage of air and gases.

While I have shown the preferred embodiment of the invention it will be understood that it is not limited to the illustrated form, but may be otherwise embodied within the scope of the following claims.

I claim:

1. The method of operating a furnace having forced draft and stack dampers, which includes automatically varying the position of one of the dampers in accordance with the pressure at a point in the furnace and automatically varying the position of the other damper in accordance with a pressure drop between two points in the furnace, substantially as described.

2. The method of operating a furnace having forced draft and stack dampers, which includes automatically varying the position of the stack damper in accordance with pressure conditions at a point in the furnace and automatically varying the position of the forced draft damper in accordance with the pressure drop between two points in the furnace, substantially as described.

3. The method of operating a battery of furnaces each having forced draft and stack dampers, which includes automatically varying the position of one of the dampers in the individual furnaces in accordance with pressure conditions at a point in such furnace, automatically varying the position of the other damper in the individual furnaces to maintain a definite pressure difference between two points in the individual furnace and modifying the action of the last-mentioned damper in accordance with a function of the battery to vary the pressure drop to be maintained, substantially as described.

4. The method of operating a furnace having air-supply means, forced draft and stack dampers, which includes automatically varying the position of one of the dampers to maintain a constant pressure condition at a point in the furnace, automatically varying the position of the other damper to maintain an established pressure drop through the furnace, modifying the control of the last-mentioned damper to vary the pressure drop to be maintained in accordance with a function of the furnace, and controlling the air supply means in accordance with a function of the furnace, substantially as described.

5. The method of operating a furnace having fuel and air-supply means and forced draft and stack dampers, which includes automatically varying the position of one of the dampers to maintain a constant pressure at a point in the furnace, automatically varying the position of the other damper to maintain a pressure drop through the furnace, modifying the control of the last-mentioned damper to vary the pressure drop to be maintained with a function of the furnace and controlling the fuel and air supply means in accordance with a function of the furnace, substantially as described.

6. The method of operating a furnace having fuel and air supply means and forced draft and stack dampers, which includes automatically varying the position of one of the dampers to maintain a constant pressure at a point in the furnace, automatically varying the position of the other damper to maintain a pressure drop through the furnace, modifying the control of the last-mentioned damper to vary the pressure drop to be maintained with a function of the furnace, and varying the rate and relative proportions of fuel and air supplied to the furnace with a function of the furnace, substantially as described.

7. The method of operating a furnace, which includes automatically maintaining an established pressure at a point in the furnace, impressing on the furnace a pressure drop through the furnace varying with a function of the furnace, and varying the proportions of fuel and air supplied to the furnace with a function of the furnace, substantially as described.

8. The method of operating a battery of furnaces, which includes automatically maintaining an established pressure at a point in each of the individual furnaces, impressing on each furnace a pressure drop through such furnace varying with a function of the battery, and automatically varying the proportions of fuel and air supplied to each of the individual furnaces with a function of the battery, substantially as described.

9. The method of operating a battery of furnaces, which includes automatically maintaining an established pressure at a point in each of the individual furnaces, impressing on each furnace a pressure drop through such furnace varying with a function of the battery, automatically varying the proportion of fuel and air supplied with a function of the battery, and varying the proportions in a furnace of the battery to compensate for its individual characteristics, substantially as described.

10. Furnace control apparatus including a furnace having fuel and air supply means, and forced draft and stack dampers, means for varying the position of one of the dampers to maintain an established pressure at a point in the furnace, means for varying the position of the other damper to maintain a given pressure drop through the furnace, means varying with a function of the furnace for modifying the action of the damper to vary the pressure drop to be maintained, and means for varying the air supply means in accordance with a function of the furnace, substantially as described.

11. Furnace control apparatus including means responsive to a function of the furnace, control means actuated thereby and effective for setting an electrical contactor on one of a plurality of contact points, a damper, a motor for actuating the damper, means including said contacts for operating the motor to set the damper in accordance with the position of the contactor, and means for adjusting said damper to maintain a predetermined pressure drop through the furnace, substantially as described.

12. Furnace control apparatus including means responsive to a function of the furnace, control means actuated thereby and effective for setting an electrical contactor on one of a plurality of contact points, a damper, a motor for actuating the damper, means including said contacts for operating the motor to set the damper in accordance with the position of the contactor, fuel-feeding means for the furnace, means governed by the function-responsive means for varying the quantity of fuel supplied thereby, and means for adjusting said damper to maintain a predetermined pressure drop through the furnace, substantially as described.

13. Furnace control apparatus including means responsive to a function of the furnace, fuel and air supply means, control means actuated by the function-responsive means and effective for varying the quantities of fuel and air supplied to the furnace, means actuated by the function-responsive means and effective for setting an electrical contactor on one of a plurality of contact points, a damper, a motor for actuating the damper, means including said contacts for operating the motor to set the damper in accordance with the position of the contactor, and means for adjusting said damper to maintain a predetermined pressure drop through the furnace, substantially as described.

14. Control apparatus for a battery of furnaces including means responsive to a function of the battery, control means actuated thereby and effective for setting an electrical contactor on one of a plurality of contact points, dampers for each of the furnaces, a motor for actuating each of the dampers, means including said contacts for operating each motor to set the dampers in accordance with the position of the contactor, and means for adjusting each damper to maintain a predetermined pressure drop through the furnace with which it is associated, substantially as described.

15. Control apparatus for a battery of furnaces including means responsive to a function of the battery, fuel supply means for each of the furnaces, control means actuated by the function-responsive means and effective for varying the amount of fuel supplied by the fuel-supply means, means actuated by the function-responsive means and effective for setting an electrical contactor on one of a plurality of contact points, dampers for the individual furnaces, a motor for actuating each damper, means including said contacts for operating the motors to set the dampers in accordance with the position of the contactor, and means for adjusting each damper to maintain a predetermined pressure drop through the furnace with which it is associated, substantially as described.

16. Furnace control apparatus for a battery of furnaces including means responsive to a function of the battery, fuel-supply means for each furnace, an electric motor for each of the fuel-supply means, a generator for supplying current to all of the motors, control means actuated by the function-responsive means and effective for varying the output of the generator, means actuated by the function-responsive means and effective for setting an electrical contactor on one of a plurality of contact points, a damper for each furnace, a motor for actuating each damper, means including said contacts for operating the motors to set the dampers in accordance with the position of the contactor, and means for adjusting each damper to maintain a predetermined drop through the furnace with which it is associated, substantially as described.

17. The combination with a furnace having means for supplying fuel thereto, a motor for driving the fuel-supplying means, a blower for supplying air to the furnace and a motor for driving the blower, of means responsive to an operating condition of the furnace for varying automatically the speed of said motors in accordance with the furnace load, a forced draft damper, and means responsive to the pressure drop between two points in the furnace for varying automatically the position of said forced draft damper.

18. The combination with a furnace having means for supplying fuel thereto, a motor for driving the fuel-supplying means, a blower for supplying air to the furnace and a motor for driving the blower, of means responsive to an operating condition of the furnace for varying automatically the speed of said motors in accordance with the furnace load, a forced draft damper, means responsive to the pressure drop between two points in the furnace for varying automatically the position of said forced draft damper, a stack damper, and means responsive to pressure conditions at a point in the furnace for varying automatically the position of the stack damper.

19. The combination with a furnace having means for supplying fuel thereto, a motor for driving the fuel-supplying means, a blower for supplying air to the furnace and a motor for driving the blower, of means responsive to an operating condition of the furnace for varying automatically the speed of said motors in accordance with the furnace load, a forced draft damper and a stack damper, means responsive to the drop in pressure between two points in the furnace for varying automatically the position of one of said dampers, and means responsive to pressure conditions at a point in the furnace for varying automatically the position of the other damper.

20. The combination with a furnace having a motor-driven blower for supplying air thereto, a forced draft damper and a stack damper, of means for adjusting automatically the speed of the motor-driven blower in accordance with the load on the furnace, means responsive to the drop in pressure between two points in the furnace for adjusting automatically the position of one of said dampers, and means responsive to a pressure condition at a point in the furnace for adjusting the position of the other of said dampers.

21. The combination with a furnace having a motor-driven blower for supplying air thereto, a forced draft damper and a stack damper, of means for adjusting automatically the speed of the motor-driven blower in accordance with the load on the furnace, means responsive to the drop in pressure between two points in the furnace for adjusting automatically one of said dampers to maintain such pressure drop substantially constant for any given furnace load, means responsive to a pressure condition at a point in the furnace for adjusting the position of the other of said dampers to maintain a desired furnace pressure, and means responsive to the load on the furnace for setting said second-named means for a desired pressure drop.

22. The combination with a furnace having a forced draft damper and a stack damper, of means responsive to the drop in pressure between two points in the furnace for positioning automatically one of said dampers so as to maintain the desired pressure drop through the furnace, and means responsive to the pressure at a point in the furnace for positioning automatically the other damper to maintain the desired pressure in the furnace.

23. The combination with a furnace having a forced draft damper and a stack damper, of means responsive to the drop in pressure between two points in the furnace for positioning automatically one of said dampers so as to maintain the desired pressure drop through the furnace, means responsive to the pressure at a point in the furnace for positioning automatically the other damper to maintain the desired pressure in the furnace, and means responsive to the load on the furnace for setting said first-named means for a desired pressure drop.

24. The combination with a battery of furnaces each having a forced draft damper and a stack damper, of means responsive to the drop in pressure between two points in each individual furnace for adjusting automatically one of its said dampers to maintain a desired pressure drop through the furnace, means responsive to a pressure condition at a point in each individual furnace for adjusting automatically the other of said dampers, and means responsive to a function of the battery of furnaces for setting said first-named means for the pressure drop to be maintained.

25. The combination with a furnace having a forced draft regulating means and an induced draft regulating means, of means responsive to the drop in pressure between two points in the furnace for positioning automatically one of said draft regulating means so as to maintain the desired pressure drop through the furnace, and means responsive to the pressure at a point in the furnace for positioning automatically the other draft regulating means to maintain the desired pressure in the furnace.

In testimony whereof I have hereunto set my hand.

MERRILL G. BENJAMIN.